United States Patent
Matsuda et al.

(10) Patent No.: US 7,263,574 B2
(45) Date of Patent: Aug. 28, 2007

(54) EMPLOYMENT METHOD OF VIRTUAL TAPE VOLUME

(75) Inventors: Kazumitsu Matsuda, Yokohama (JP); Yoshiaki Shinmura, Chigasaki (JP); Takeaki Murakoso, Hiratsuka (JP); Yasunori Uejima, Yamatotakada (JP); Hirokazu Tamaki, Izumi (JP)

(73) Assignee: Hitachi, Ltd., Tokyo (JP)

( * ) Notice: Subject to any disclaimer, the term of this patent is extended or adjusted under 35 U.S.C. 154(b) by 232 days.

(21) Appl. No.: 11/033,385

(22) Filed: Jan. 12, 2005

(65) Prior Publication Data

US 2006/0106970 A1 May 18, 2006

(30) Foreign Application Priority Data

Nov. 15, 2004 (JP) ............................. 2004-329946

(51) Int. Cl.
*G06F 12/00* (2006.01)
(52) U.S. Cl. ............................. 711/4; 711/202; 711/111
(58) Field of Classification Search ...................... 711/4
See application file for complete search history.

(56) References Cited

U.S. PATENT DOCUMENTS 6,557,073 B1 * 4/2003 Fujiwara et al. ............ 711/111

FOREIGN PATENT DOCUMENTS

JP 2004-227448 8/2004

* cited by examiner

*Primary Examiner*—Reginald Bragdon
*Assistant Examiner*—Eric S Cardwell
(74) *Attorney, Agent, or Firm*—Mattingly, Stanger, Malur & Brundidge, P.C.

(57) ABSTRACT

Conventionally, it has been impossible to use a virtual tape volume having the same volume serial number and different media. A computer implemented virtual tape system enables making definition of a virtual tape volume of another medium with the same volume serial number and definition of a virtual tape magazine of grouped virtual tape in a virtual tape management table. A virtual tape control mounts a virtual tape volume of a virtual tape magazine used in a job or a virtual tape volume on a virtual tape device based on a management table correlating the job with the virtual tape magazine or a command.

6 Claims, 9 Drawing Sheets

FIG.4

500 MANAGEMENT TABLE FOR CORRELATING JOB WITH VIRTUAL TAPE MAGAZINE

| 501 MAGAZINE (GROUP IDENTIFIER) | 502 VOLUME SERIAL NUMBER | 503 MEDIUM IDENTIFIER OF THE SAME VOLUME SERIAL NUMBER | 504 JOB NAME | 505 STEP NAME | 506 DATA SET NAME | 507 EXECUTION DATE | 508 EXECUTION INTERVAL |
|---|---|---|---|---|---|---|---|
| 1 | — | — | JOB1 | STEP1 | DS1 | yyyy.mm.01 | 2 DAYS |
| 2 | — | — | JOB1 | STEP1 | DS1 | yyyy.mm.02 | 2 DAYS |
| 3 | — | — | JOB2 | STEP1 | DS1 | yyyy.mm.07 | 2 DAYS |
| 4 | — | — | JOB2 | STEP2 | DS2 | yyyy.mm.07 | 7 DAYS |
| 5 | — | — | JOB3 | STEP3 | DS3 | yyyy.mm.30 | 30 DAYS |
| 6 | — | — | JOBn | — | — | yyyy.mm.01 | — |
| … | … | … | … | … | … | … | … |
| — | VOL001 | n | JOBm | — | — | yyyy.mm.01 | — |
| — | … | … | … | … | … | … | … |

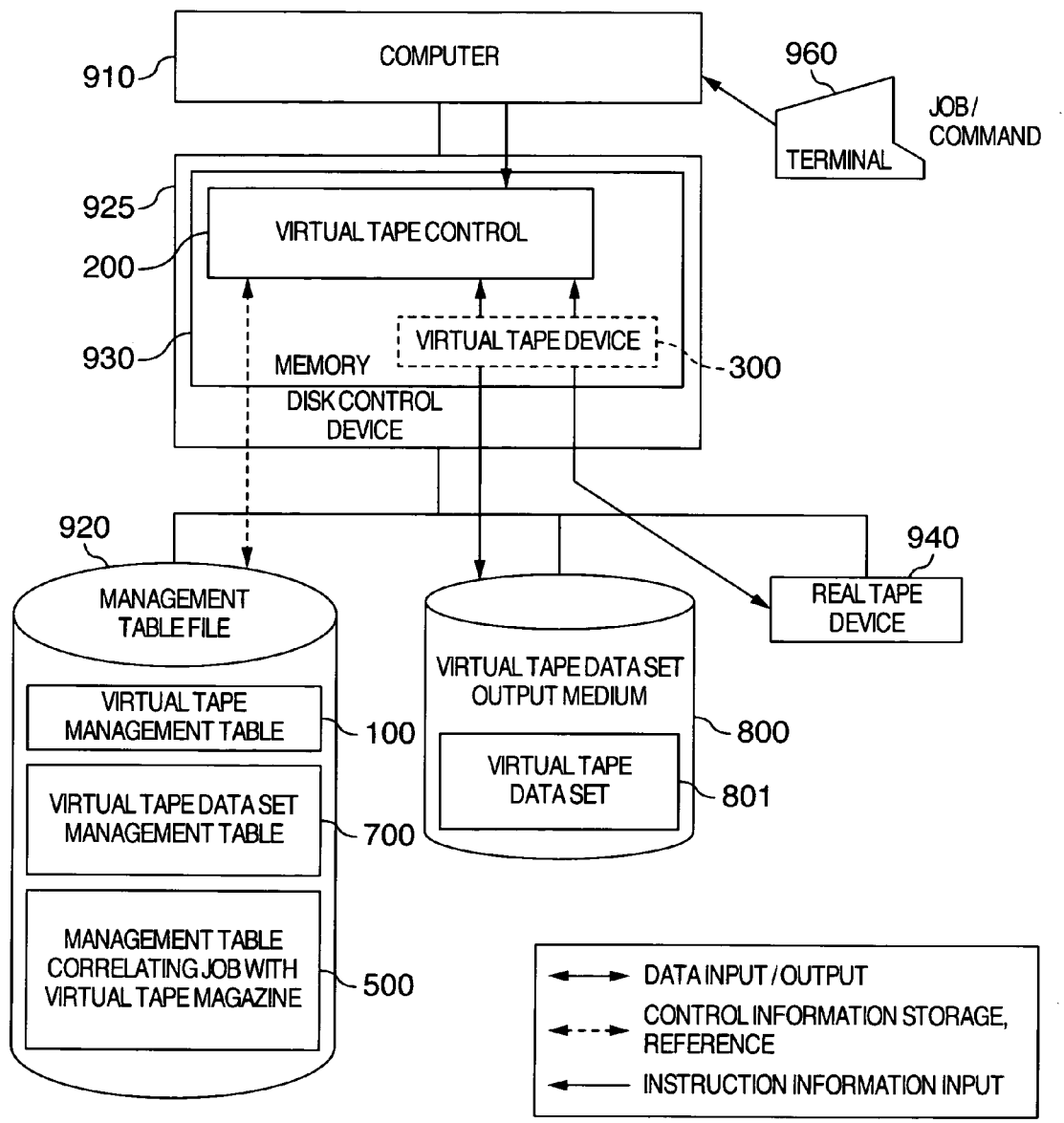

EMPLOYMENT METHOD OF VIRTUAL TAPE VOLUME

INCORPORATION BY REFERENCE

The present application claims priority from Japanese application JP2004-329946 filed on Nov. 15, 2004, the content of which is hereby incorporated by reference into this application.

BACKGROUND OF THE INVENTION

The present invention relates to a virtual tape system for emulating input/output to/from a magnetic tape volume to a medium replacing a magnetic tape such as a magnetic disk by using a computer device such as a main frame.

Conventionally, as is disclosed in JP-A-2004-227448, identification of a virtual tape volume is performed by a volume serial number (volume name in the aforementioned document). Since the volume serial number of the virtual tape volume is unique in the system, it is possible to judge whether the volume specified by a job is a virtual tape volume, so that the system can automatically select a virtual tape volume and make it to an I/O-enabled state (hereinafter, called "mount"). Moreover, since the virtual tape volume can be automatically mounted in the system, there is no need of grouping the virtual tape volumes to reduce the operation of the operator.

SUMMARY OF THE INVENTION

In the aforementioned conventional technique, no consideration is taken on the case of executing a job using different media with the same volume serial number. As a result, when the conventional technique is applied to a job such as performing backup by modifying the medium with the same JCL (Job Control Language: control sentence for assigning a data set to the volume used in the job), it is necessary to modify the JCL so that each medium has a different volume number.

In the present invention, by adding a medium identifier for identifying a medium to a virtual tape volume of different media with the same volume serial number (hereinafter, may be referred to simply as a virtual tape volume), media of the same volume serial number can be managed as different media and in the job performing I/O to/from a different media with the same JCL, the virtual tape volume of different media can be applied with the same volume serial number.

Moreover, when a virtual tape volume of different media with the same volume serial number is present, the virtual tape volume to be used cannot be determined and mounted automatically by the system. Accordingly, Each time a job using a virtual tape volume of different media with the same volume serial number is executed, operation of each virtual tape volume unit is required such as response of the medium identifier of the virtual tape volume by the operator.

According to the present invention, the virtual tape volumes used in the I/O job are grouped so that a user can grasp and manage the virtual tape volumes in the group unit without considering the respective virtual tape volumes used in the I/O job, thereby simplifying the employment.

In order to achieve the aforementioned object, virtual tape volumes having the same volume serial number and stored in different media are grouped so as to be managed by a group called a virtual tape magazine. A virtual tape management table additionally includes definition information on the virtual tape volume, i.e., a magazine (group) identifier as information for managing a virtual tape volume of which virtual tape magazine.

Moreover, the same volume serial number identifying a virtual tape volume of anther medium can correlate a virtual tape device to each job of data input/output to/from the virtual tape volume of the another medium by using the same JCL, so as to enable movement of a virtual tape volume between virtual tape magazines and operation of each virtual tape volume. For this, a medium identifier of each medium belonging to the same volume serial number is added as virtual tape volume definition information to the virtual tape management table.

That is, in this invention, the virtual tape volumes are identified by a volume serial number referenced by the JCL and medium identifiers corresponding to different media belonging to the serial number. These virtual tape volumes are grouped by the job execution unit and a magazine identifier for identifying a group is given to each group. When a virtual tape data set is created in a virtual tape volume, a virtual tape data set name is given to each tape data set, which is correlated with the volume serial number of the output destination of the virtual tape data set as the virtual tape data set output medium.

Furthermore, in a typical job, virtual volumes (virtual tape magazines) or a single virtual tape volume used are fixed and the job execution interval is regular such as daily or weekly. Accordingly, in order to reduce the virtual tape volume assignment operation (mount operation) by the operator upon employment, a management table is created for correlating the job with the virtual tape magazine or a virtual tape volume. When a job is registered in this management table, upon job execution, the system assigns (mounts) a virtual tape magazine or a virtual tape volume to be used in the job according to the management table. This reduces an erroneous operation by a user.

Moreover, even when a job is not typical and not registered in the management table correlating the job with the virtual magazine or the virtual tape volume, a command can be issued for assigning (mounting on the virtual tape device) a virtual tape magazine or a virtual tape volume of a different medium with the same volume serial number, thereby enabling flexible operation.

As has been described above, in this invention, a virtual tape volume or virtual tape volumes which are grouped are correlated with a job or operated in group unit, thereby simplifying the management of employment and operation.

Moreover, since it is possible to define and operate different volume serial numbers in the same medium, it is possible to enlarge the application job of the virtual tape system.

Other objects, features and advantages of the invention will become apparent from the following description of the embodiments of the invention taken in conjunction with the accompanying drawings.

BRIEF DESCRIPTION OF THE DRAWINGS

FIG. 4 shows a format of a management table for correlating with a job using the virtual tape magazine or the virtual tape volume.

FIG. 9 shows a hardware configuration diagram when carrying out the present embodiment in a disk control device.

DESCRIPTION OF THE EMBODIMENT

Description will now be directed to an embodiment of the present invention with reference to the attached drawings.

Figure 1:
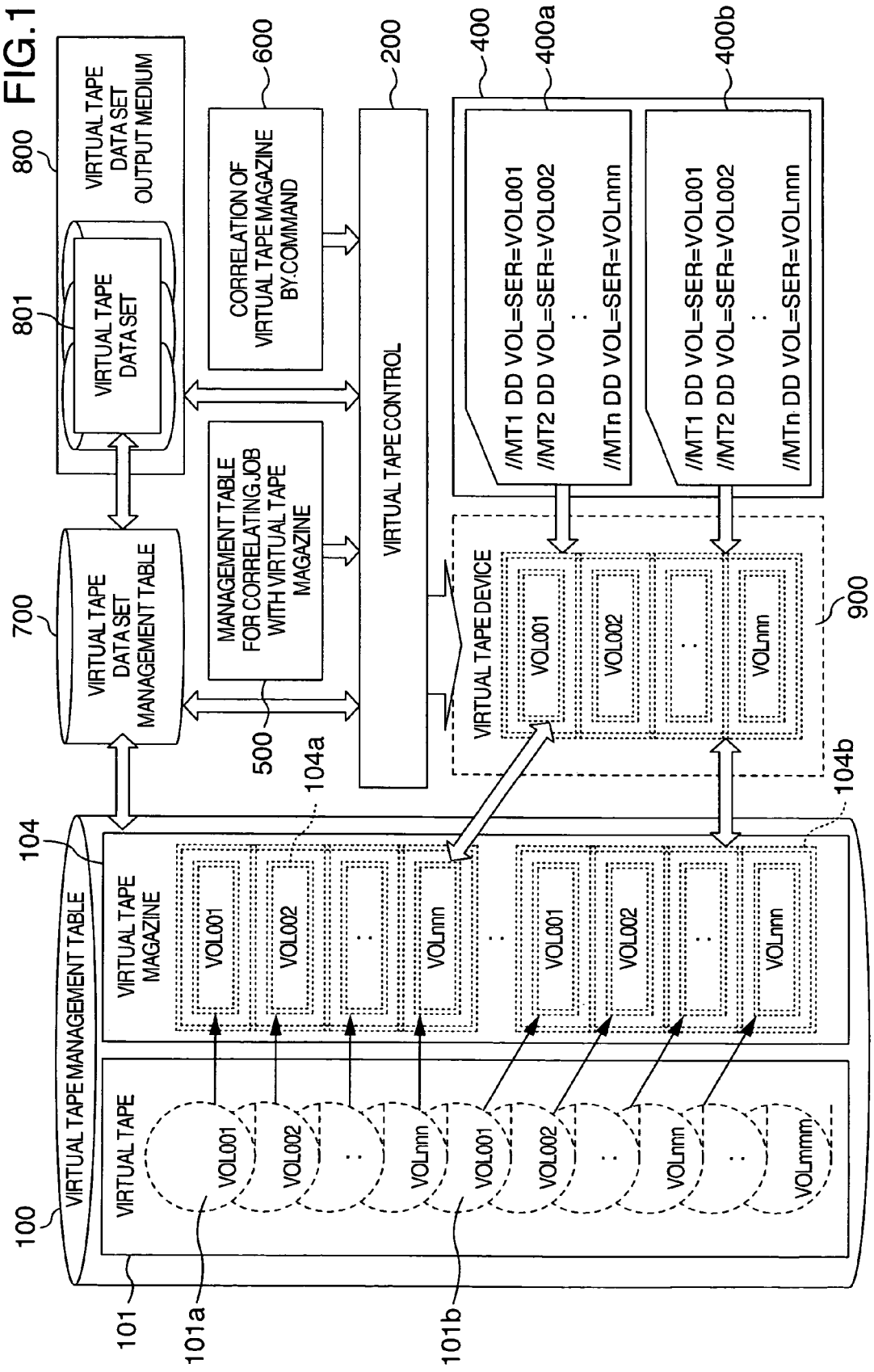
FIG. 1 is a configuration diagram showing an embodiment of the present invention.
Figure 7:
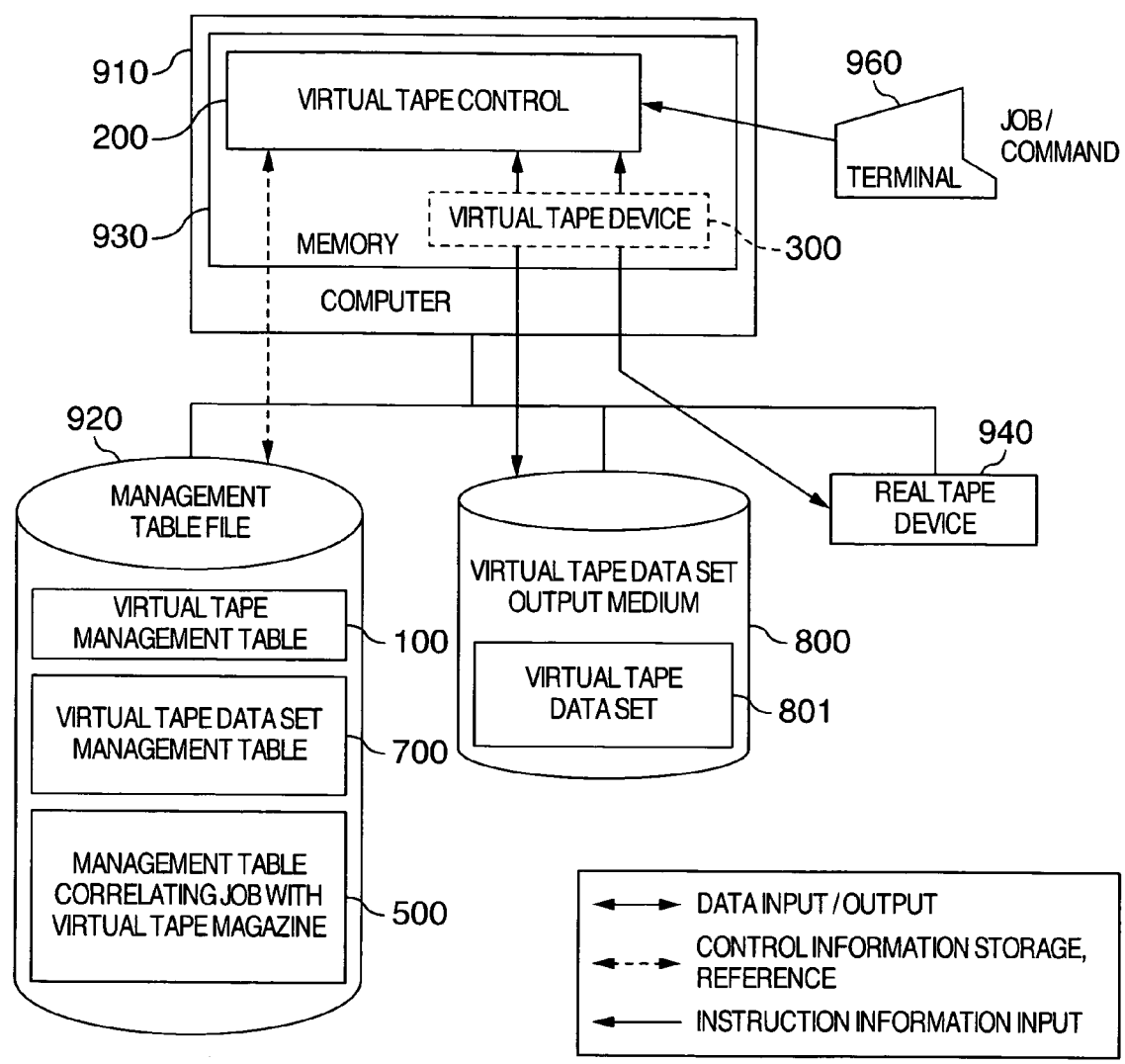
FIG. 7 shows a hardware configuration diagram for carrying out the present embodiment.

FIG. 1 is a configuration diagram showing a virtual tape system according to an example of an embodiment of the present invention. FIG. 7 shows a hardware configuration for carrying out the virtual tape system. The virtual tape system in FIG. 7 includes a computer 910, a virtual tape data set output medium 800 for storing the virtual tape data, a management table file 920 containing information for controlling the I/O of the data to/from the output medium, and a real tape device 940 which are connected to one another via a network. This network may be SAN (Storage Area Network) or LAN (Local Area Network). Moreover, the computer 910 is connected to a terminal 960 for entering a job and a command. The computer 910 includes a memory 930 and a CPU. The memory 930 contains a virtual tape control program 200 (hereinafter, referred to simply as virtual tape control) for executing the employment method of the virtual tape volume in this embodiment. The virtual tape control 200 performs data I/O control to/from the virtual tape data set output medium 800 or the real tape device 940. Moreover, the virtual tape control 200 makes control so that data set I/O to/from the virtual tape data set output medium 800 can be handled in the same way as the data set I/O to/from the real tape device 940. For this, in this embodiment, the virtual tape control 200 performs data I/O processing to/from the virtual tape data set output medium 800 or the real tape device 940 via the interface of the virtual tape device 300. In particular, hereinafter, explanation will be given on the data I/O processing to/from the virtual tape data set output medium 800. Moreover, in the explanation below on the present embodiment, the "mount" operation on the virtual tape device 300 means assignment of the virtual tape data set output medium 800 or the like via the interface of the virtual tape device 300.

The virtual tape data set output medium 800 is a storage device having a plurality of physical disks and the storage device contains at least one virtual tape data set 801. Here, data recorded on one tape or data recorded on a plurality of tapes is divided into a predetermined block unit while maintaining the format recorded on the tape and stored in the plurality of physical disks. For this, as the entire storage device, data recorded on one tape or data recorded on a plurality of tapes is stored and the entire data is handled as the virtual tape data set. The management table file 920 stores a virtual tape management table 100, a virtual tape data set management table 700, and a management table 500 correlating the job to the virtual tape magazine. This management table file 920 is stored in a storage device containing the virtual tape data set 801 or another storage device, or in the memory of the computer 910.

FIG. 1 shows an example in which virtual tape volumes 101 (101a, 101b) of the same volume serial number having different media are defined in the virtual tape management table 100 and the same JCL 400 (400a, 400b) uses the different virtual tape volumes (101a, 101b) of the same volume serial number. That is, this is the case when the same JCL 400 uses different virtual tape volumes.

The job is defined by the JCL 400. The virtual tape volumes 101 subjected to data input/output by the JCL 400 are grouped by the execution job unit and defined as a group of the virtual tape magazine 104. Furthermore, as shown in this figure, different virtual tape magazines 104 (104a, 104b) are defined for the same JCL 400. In order to use the virtual tape magazine 104a used in the JCL 400a, in the interface of the virtual tape device 300, the management table 500 for correlating the job registered by the user with the virtual tape magazine correlates the virtual tape magazine 104a with the JCL 400a and defines the execution date (execution condition). When the JCL 400a is executed on the execution date defined, the virtual tape magazine 104a corresponding to the JCL 400a is mounted on the virtual tape device 300 and the virtual tape volume 101a grouped in the virtual tape magazine 104a is used. Similarly, for the JCL 400b which is the same as the JCL 400a, the management table 500 correlates the virtual tape magazine 104b with the JCL 400b and defines the execution date (execution condition). It should be noted that this is the same as that the JCL 400a is correlated with the virtual tape magazine 104b and the execution date is defined.

It should be noted that the virtual tape device 300 is a logical tape device and the virtual tape control 200 performs data I/O processing by the virtual tape data set output medium 800 or the real tape device 940 and JCL via the interface of the virtual tape. Moreover, it is also possible to prepare some virtual tape devices 300 and assign the virtual tape devices 300 to each of the virtual tape data set output medium 800 and the real tape device 940 so that data I/O processing can be performed between the virtual tape data set output medium 800 and the real tape device 940. For example, it is possible to divide the data stored in the real tape device 940 into blocks by the JCL and transfer it to the virtual tape data set output medium 800.

The virtual tape control 200 selects the virtual tape magazine 104a or 104b before or during the execution of the JCL 400 according to the execution condition registered in the management table 500 (FIG. 4) correlating the job with the virtual tape magazine. It should be noted that here according to the instruction from the terminal 960, the virtual tape magazine 104a or 104b may be selected finally. When the virtual tape magazine 104b is selected according to the execution condition, the virtual tape control 200 mounts the virtual tape volume 101b requested by the JCL 400b on the virtual tape device 300 and assigns the virtual tape data set 801 to the virtual tape data set output medium 800 such as a magnetic disk, thereby performing data I/O processing. It should be noted that in order to perform data output to the virtual tape device 300, information on the virtual tape data set 801 is registered in the virtual tape data set management table 700 and the virtual tape management table 100.

Figure 2:
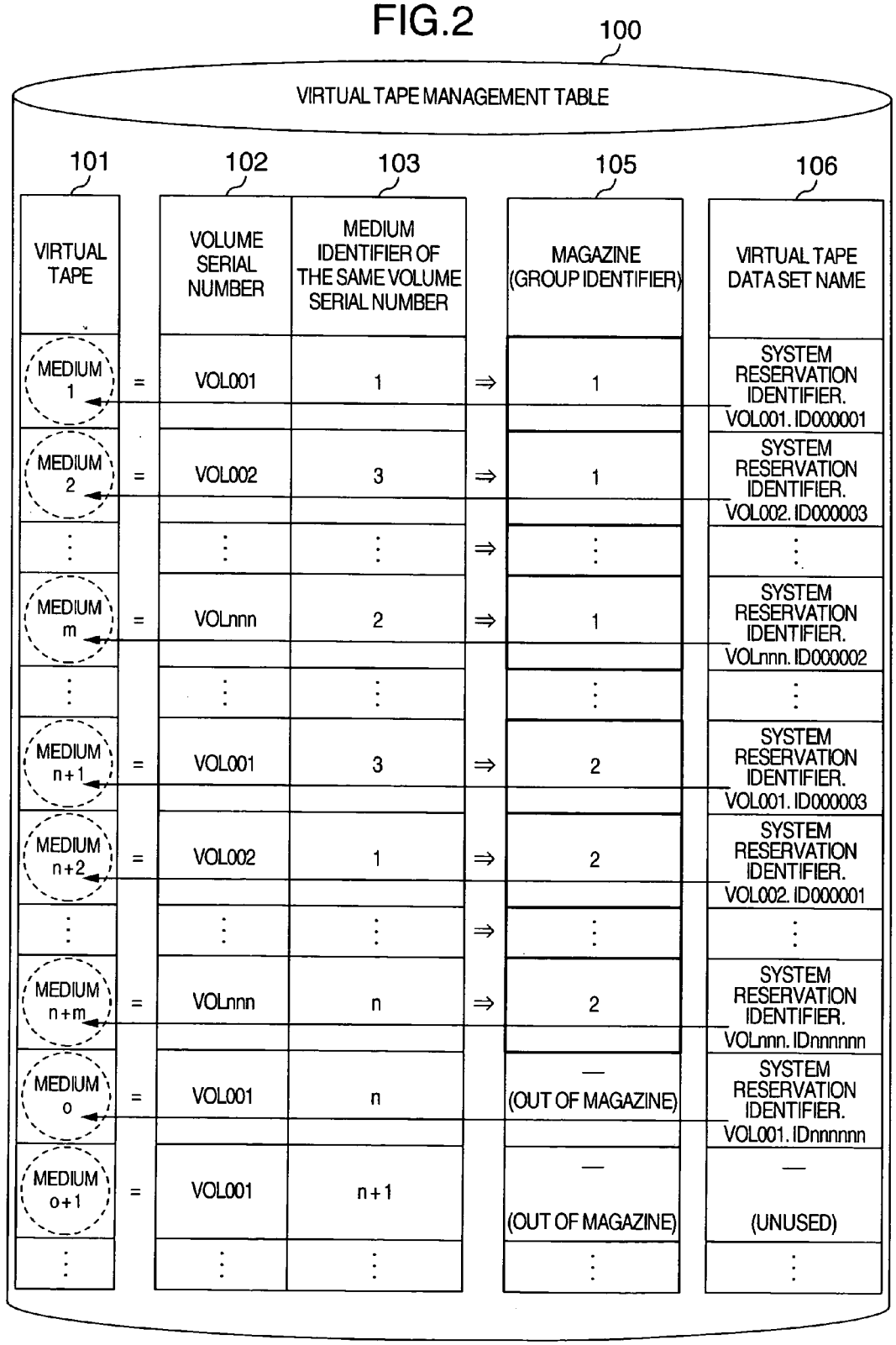
FIG. 2 shows a format of management table for managing the correspondence between the virtual tape volumes of the same volume serial number and different media, and the virtual tape magazines.

FIG. 2 shows an example of the virtual tape management table 100. The virtual tape volume 101 is defined by the volume serial number 102 and medium identifier 103 of the same volume serial number and each of them is managed as different tape volumes (media) 101. The virtual tape volume 101 grouped by the job execution unit is defined to be a virtual tape of which virtual tape magazine by the magazine identifier 105.

When the virtual tape data set 801 is stored in the virtual tape data set output medium 800 corresponding to the virtual tape volume 101, a name is registered in the virtual tape data set name 106. The virtual tape data set name 106 is configured so as to include the volume serial number 102 and the medium identifier 103 of the same volume serial number so that uniqueness of the virtual tape data set name 106 is guaranteed and it is possible to prevent loss of data by erroneous data read in or overwrite.

Moreover, when the magazine identifier 105 is modified by means such as the definition utility of the virtual tape provided by the virtual tape control 200, it is possible to operate it as another virtual tape magazine 104. Moreover, as the medium O of the virtual tape 101 shown in FIG. 2, when the magazine identifier 105 is not specified, it is possible to operate a virtual tape volume 101 as a single body instead of operating it as a group by the magazine identifier 105.

Figure 3:
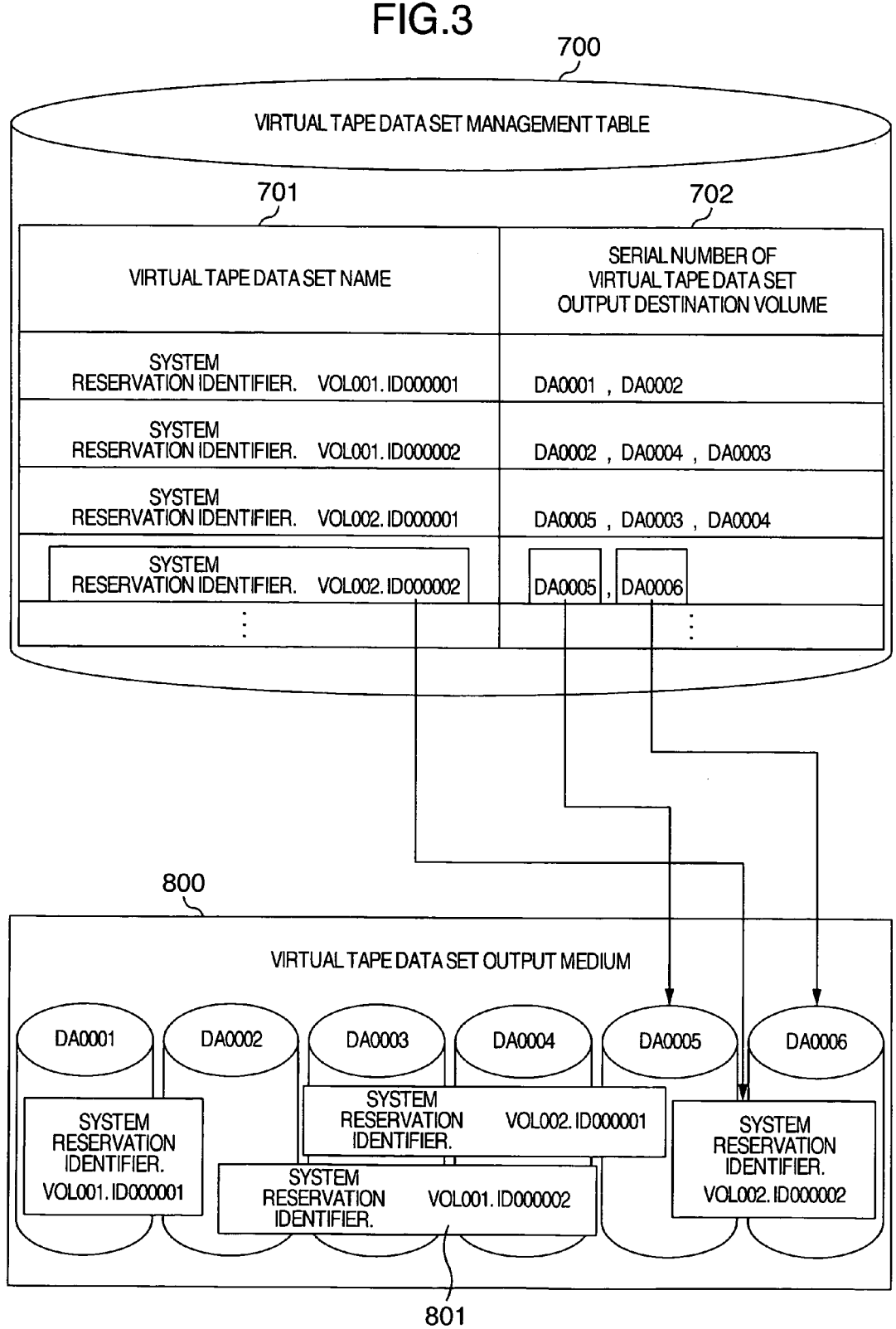
FIG. 3 shows a format of a management table for managing virtual tape data sets.

FIG. 3 shows an example of the virtual tape data set management table 700 for managing the virtual tape data set 801. In the virtual tape data set management table 700, the virtual tape data set name 701 and the volume serial number 702 of the virtual tape data set output destination are registered as an allocation destination medium of the virtual tape data set 801 to be stored in the virtual tape data set output medium 800 such as a magnetic disk. The virtual tape data set name 701 of the outputted virtual tape volume 101 is registered in the virtual tape data set name 106 of the virtual tape management table 100. In the input of the virtual tape data set name 106 of the virtual tape volume 101, the volume serial number 702 of the output destination of the virtual tape data set is obtained from the registered information on the virtual tape data set name 701 of the same name registered in the virtual tape data set management table 700. By using this, input processing is performed to the output medium of the virtual tape data set 801.

That is, in the management table shown in FIG. 2 and FIG. 3, the virtual tape volume 101 is identified by the volume serial number 102 referenced by the JCL and the medium identifier 103 corresponding to a different medium belonging to the serial number. The virtual tape volumes are grouped by the job execution unit and the magazine identifier 105 for identifying the group is given to each group. When a virtual tape data set is created in the virtual tape volume, virtual tape data set names 106, 701 are given to each tape data set and are correlated with the volume serial number 702 of the output destination of the virtual tape data set which is the virtual tape data set output medium 800.

FIG. 4 shows an example of the management table 500 for managing the correlation between the job and the virtual tape magazine. When executing a job having a job name 504, a step name 505 (information for identifying some steps contained in the JCL having the job name 504) or a data set name 506 which are different, the magazine identifier 505 of the virtual tape magazine 104 which has grouped the virtual tape volume 101 used by the job is registered as the magazine identifier 501 used in the job. Alternatively, the volume serial number 102 of the virtual tape volume and the medium identifier 103 of the same volume serial number are registered as the volume serial number 502 of the virtual tape volume used in the job and the medium identifier 503 of the same volume serial number. Furthermore, these are registered while correlating them with the job name 504, the step name 505, or the data set name 506, so that upon execution of the job JCL 400, it is possible to use the virtual tape magazine 104 used or the virtual tape volume 101 via the interface of the virtual tape device 300.

According to the management table 500, the virtual tape control 200 mounts on the virtual tape device 300 the virtual tape magazine 104 corresponding to the magazine identifier 501 defined to be used in the job having the job name 504 or the virtual tape volume 101 corresponding to the volume serial number 501 of the defined virtual tape volume and the medium identifier 503 of the same volume serial number, thereby performing I/O processing to/from the virtual tape volume 101.

Furthermore, by registering the execution date 507, the virtual tape control 200 can judge a virtual tape magazine 104 grouped by the same volume serial number but having different magazine identifiers 105 of the virtual tape magazine used by the JCL 400 of the same job executed on different days so that it can be used in the virtual tape device 300. For example, in FIG. 4, the magazine identifiers 1 and 2 are executed on the different days and have different magazine identifiers. Accordingly, even when the same JCL (JOB1) is used, different media are used for them. The same applies for the virtual tape volume 101 having different medium identifiers 103 of the same volume serial number and the same volume serial number 102.

Moreover, by registering the execution interval 508, there is no need of registering correlation of the same virtual tape magazine used in the same job for each of the execution days. For example, in FIG. 4, the magazine identifiers 1 and 2 have different execution dates and different magazine identifiers. Accordingly, even when they are used by the same JCL (JOB1), different media are used for them. Furthermore, when the magazine identifier is 1, the JCL (JOB1) is executed on the days of odd numbers of the month mm of the year yyyy and when the magazine identifier is 2, the same JCL is executed on the days of even numbers. In this case, different media are used every other day. The same applied for the same virtual tape volume.

Figure 5:
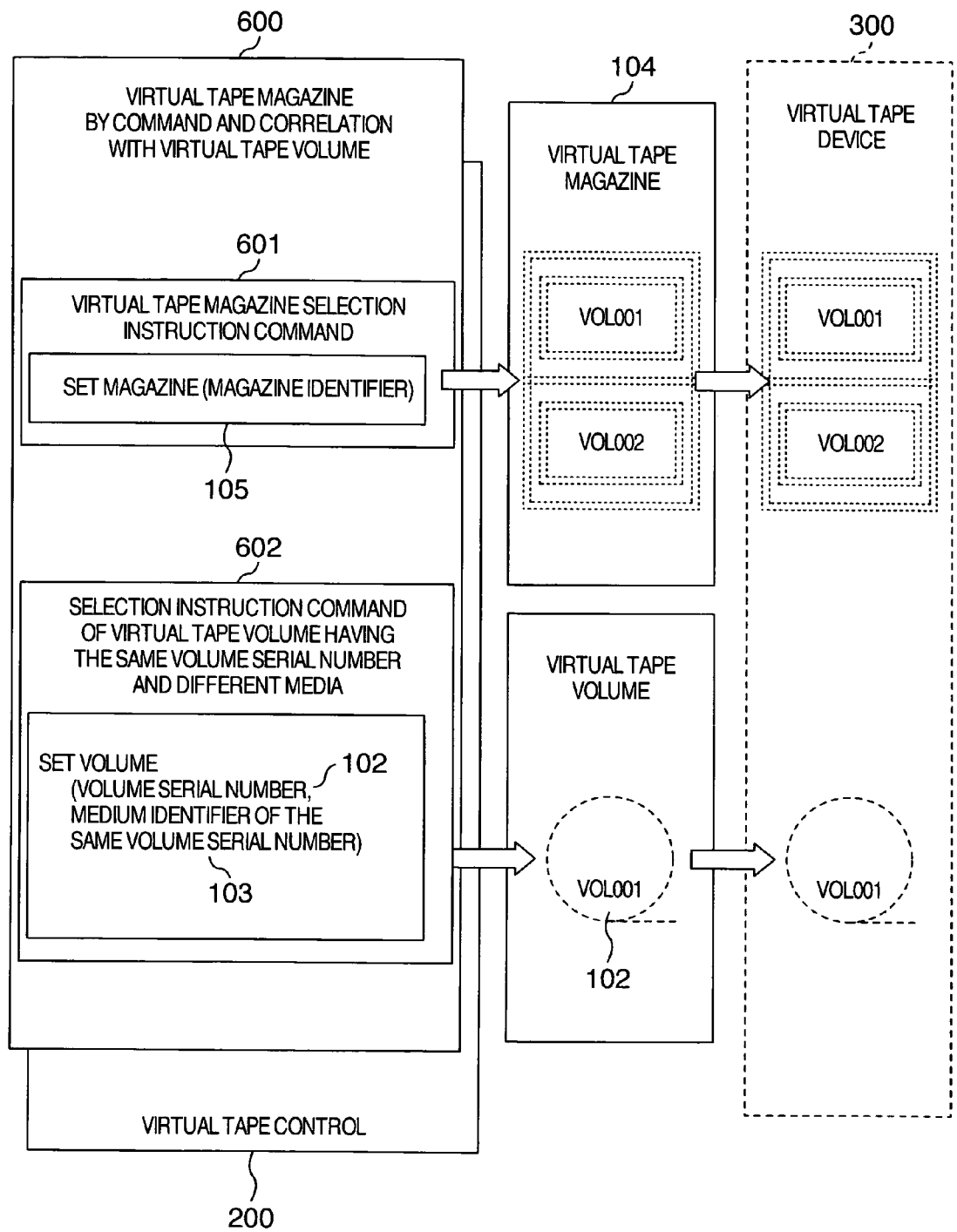
FIG. 5 shows an embodiment for selecting a virtual tape magazine or a virtual tape volume of the same volume serial number to be used by the virtual tape device.

FIG. 5 shows an embodiment using a virtual tape magazine 104 in the virtual tape device 300 according to the correlation between the virtual tape magazine and the virtual tape volume by the virtual tape magazine selection instruction command 601 inputted via the terminal 960. Furthermore, there is shown an embodiment of using the virtual tape volume 101 in the virtual tape device 300 by the virtual tape volume selection instruction command 602 of another medium with the same volume serial number.

The virtual tape magazine selection instruction command 601 specifies the magazine identifier 105 of the virtual tape magazine and instructs the virtual tape magazine 104 to be used in the virtual tape device 300. According to the magazine identifier 105 of the virtual magazine, the selection instruction command 601 searches the management table 100 of FIG. 2 and performs data I/O to/from the virtual tape device 300.

The selection instruction command 602 of the virtual tape volume of another medium with the same volume serial number specifies the volume serial number 102 of the virtual tape volume and the medium identifier 103 of the same volume serial number and instructs the virtual tape magazine 104 to be used in the virtual tape device 300.

Figure 8:
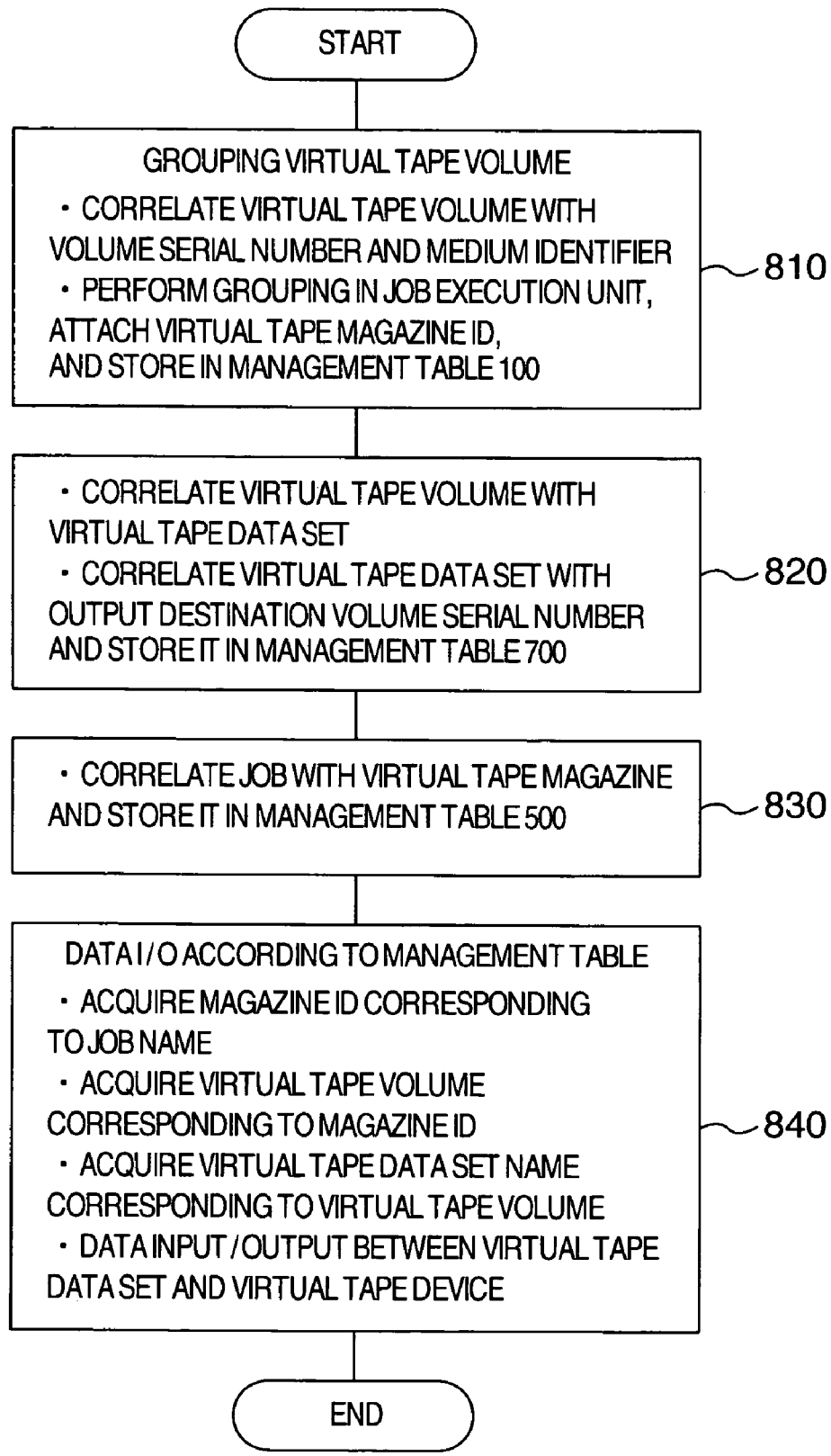
FIG. 8 is a flowchart for processing from setting of various management tables to the I/O control using them.

FIG. 8 shows a procedure from creation of the management table shown in FIGS. 2, 3, and 5 to the I/O processing using the management tables. The following processes are executed in the virtual tape control 200 shown in FIGS. 1 and 7.

The virtual tape volumes are defined by the volume serial number referenced by the job and the medium identifiers corresponding to the different media belonging to the serial number. The magazine identifiers are defined so as to group these virtual tape volumes in job execution unit and these information are stored in the management table 100 shown in FIG. 2 (step 810).

When a virtual tape data set is stored in the virtual tape volume, a virtual tape data set name is defined for each of the virtual tape data sets, and the virtual tape control 200 correlates the volume serial number of the virtual tape data set storage destination which is the virtual tape data set output medium with the virtual tape data set name and stores the correlation in the management table 700 shown in FIG. 3 (step 820).

The virtual tape control 200 correlates the inputted job name with the magazine identifier of the virtual tape magazine and stores the correlation in the management table 500 shown in FIG. 4 (step 830).

When executing a job, a magazine identifier corresponding to the job name is acquired according to the execution condition registered in the management table 500 in FIG. 4. Next, the respective steps defined by the JCL which is the job are executed successively. Here, when the volume serial number is defined as a step, the virtual tape data set name is acquired from the virtual tape management table 100 of FIG. 2 by the volume serial number and the magazine identifier already acquired. Next, according to the management table 700 of FIG. 3, a storage area of the virtual tape data set output medium 800 is specified from the virtual tape data set name and the data I/O processing of the virtual tape data set is performed between the virtual tape device and the storage area specified. (Step 840)

Figure 6:
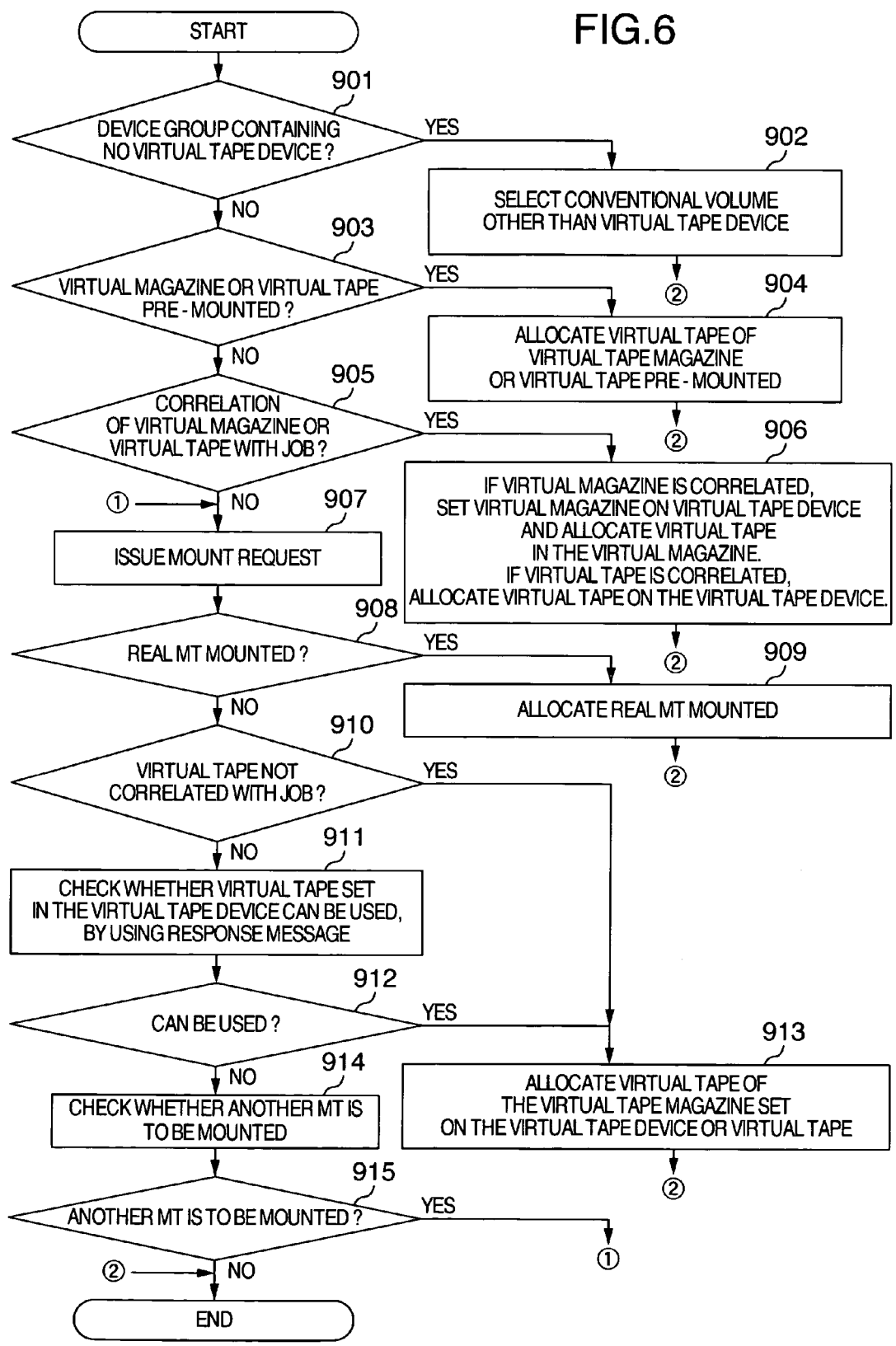
FIG. 6 is a flowchart for deciding a virtual tape magazine or a virtual tape volume for performing I/O by virtual tape control.

In the aforementioned embodiment, it is assumed that the virtual tape magazine or the virtual tape volume used in the job by the virtual tape control 200 is mounted when executing the data I/O processing. In FIG. 6, before executing data I/O processing, it is checked whether the virtual tape magazine or the virtual tape volume is mounted on the disk device. When a conventional magnetic tape is used, it is checked whether a magnetic tape is mounted on the real tape device. Then, the magnetic tape or the virtual tape volume is selected. The process of FIG. 6 includes an interactive process with an operator. Moreover, the processing of FIG. 6 shows a processing when applying the processing for mounting a conventional magnetic tape on a real tape device to a virtual tape magazine or a virtual tape volume.

FIG. 6 shows processing of the virtual tape control 200.

In FIG. 6, it is determined whether the device group or the device symbol name specified by the JCL 400 does not include the virtual tape device 300 (step 901). That is, the device specified by the JCL 400 judged whether to perform data I/O via the virtual tape device 300. If the device group does not include the virtual tape device 300, the conventional volume selection is performed for those other than the virtual tape device (step 902) and the processing is terminated.

If the device group specified by the JCL 400 includes the virtual tape device 300, before executing the job, it is checked whether the virtual tape magazine or the virtual tape volume has been mounted on the virtual tape device 300 in advance (pre-mounted) (step 903). If pre-mounted, the virtual tape volume registered in the pre-mounted virtual tape magazine is allocated to the job (step 904) and the selection processing of the magnetic tape or the virtual tape volume is terminated.

Unless pre-mounted, search is performed to determine whether the virtual tape magazine or the virtual tape volume is registered in the management table 500 correlating the job with the virtual tape magazine (step 905). If the virtual tape magazine is correlated with the execution job, the virtual tape volume registered in the correlated virtual tape magazine is allocated for the job. If correlated, the correlated virtual tape volume is allocated for the job (step 906) and the selection process of the magnetic tape or the virtual tape volume is terminated. If the correlation between the job and the virtual tape magazine is not registered in the management table 500, a mount request is issued to the operator (step 907). Then, it is judged whether the volume to be mounted sent by the operator is a magnetic tape of a real medium (step 908). If the volume is a magnetic tape of the real medium, the magnetic tape of the real medium is allocated for the job (step 909) and the selection process of the magnetic tape or the virtual tape volume is terminated.

In response to the mount request (step 907), if the operator inputs a command 600 which is judged to be a virtual tape magazine or a virtual tape volume using the virtual tape device 300, it is judged whether the specified virtual tape magazine or the virtual tape volume is registered in the management table 500 correlating the job with the virtual tape magazine (step 910). If the virtual tape magazine or the virtual tape volume is registered in the management table 500 correlating the job with the virtual tape magazine, a response message is issued to the operator to check whether it is possible to use the virtual tape magazine or the virtual tape volume instructed to select the virtual tape device 300 (step 911). When the operator instructs to select the virtual tape device 300 by the command 600, it is judged whether it is possible to use the virtual tape magazine or the virtual tape volume or the virtual tape volume selected to be used in the virtual tape device 300 (step 912). When response indicates usability, the virtual tape volume registered in the virtual tape magazine or the virtual tape volume selected to be used in the virtual tape device by the command 600 or the virtual tape volume is allocated for the job (step 913) and the selection process of the magnetic tape or the virtual tape volume is terminated.

When the virtual tape magazine or the virtual tape volume selected by the command 600 so as to be used in the virtual tape device 300 cannot be used (step 912), a response message is issued to check whether to mount another magnetic tape or virtual tape volume (step 914). When the response to mount another magnetic tape or virtual tape volume is received from the operator (step 915), the mount request is again issued to the operator (step 907). When the response not to mount another magnetic tape or virtual tape volume is sent (step 915), no magnetic tape or virtual tape volume is allocated for the job and the selection process is terminated. The job is terminated with the allocation error.

FIG. 9 shows a hardware configuration for carrying out the employment method of the present embodiment in a disk control device 925 connected to the computer 910. According to the job and command inputted from the terminal 960 connected to the computer 910, the disk control device 925 executes the virtual tape control 200 of the present embodiment stored in the memory 930. The processing executed in the virtual tape control 200 is identical to the processing shown in FIG. 8.

The program for executing the employment method of the present embodiment described above can be stored in a computer-readable storage medium so that during program execution, this program is read into the memory of the computer so as to be executed.

Thus, a plurality of logical volumes can be defined as a group by a magazine identifier and a plurality of groups defined by the magazine identifiers can be correlated to one JCL. More specifically, the logical volume constituting a group is defined by the JCL and is a virtual logical volume which is different from the logical volume defined logically as a storage area of the storage device. For this, in order to use the logical volume of the storage device, for each group, the logical volume of the storage device is correlated to the virtual logical volume when defined. Accordingly, even when the same virtual logical volume is defined by different groups, it is possible to define the different logical volumes of the storage device. That is, even when the same virtual logical volume is specified by the JCL, it is possible to handle logical volumes of the different storage device or different data by selecting the group. For this, the condition selected for each group is defined so that logical volumes of different storage devices can be treated by the same JCL.

Moreover, data of one tape is divided into blocks while maintaining the data format and they are stored in a plurality of logical volumes, which are collected into one group, so that tape data is virtually stored in the storage device. By reading out the data on group unit, the data stored on the tape can be treated. It should be noted that a plurality of tapes can constitute one group.

It should be noted that the embodiment has been explained by using an example of data stored on a tape. However, as has been explained above, the use of the different logical volume by the same JCL is not limited to the data recorded on a tape but may be the data stored in the storage device.

Moreover, the logical volume defined in the same virtual logical volume may be of the same storage device or of different storage devices.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A computer system comprising:
a first storage device having a plurality of first logical volumes set logically, each of the first logical volumes being identified with a volume identifier and a medium identifier for identifying one of a plurality of mediums belonging to the volume identifier;
a second storage device which stores a plurality of groups each composed of second logical volumes virtually set which are correlated with a selection condition under which respective groups are selected and further stores a correspondence between the second logical volumes and volume identifiers and medium identifiers of the first logical volumes; and
an information processing device which selects one group according to the selection condition by execution of a program, specifies a second logical volume specified by the program based on the selected group, specifies a first logical volume corresponding to the specified second logical volume based on the correspondence stored in the second storage device, and accesses the specified first logical volume, corresponding to the specified second logical volume based on the volume identifier and the medium identifier of the first logical volume belonging to the selected group.

2. A computer system as claimed in claim 1, wherein each of the first logical volumes store data recorded on a tape and divided into block units.

3. A computer system as claimed in claim 1, wherein the groups define the same second logical volumes and the second storage device stores a correspondence between each of the same second logical volumes and the first logical volumes for each group.

4. A computer system comprising:
a first storage device which stores a virtual tape data set corresponding to each of at least one virtual tape volume which has virtually emulated a magnetic tape by a disk device;
a second storage device which stores a management table used for grouping the virtual tape volume in job unit by a volume serial number and a medium identifier corresponding to the job unit for identifying the virtual tape volume and correlates the virtual tape volume with the virtual tape data set; and
a computer connected to the first storage device and the second storage device for determining a group of the virtual tape volume corresponding to the job unit and performing a data I/O processing for the virtual tape data set stored in the first storage device according to the management table upon job execution, the virtual tape data set corresponding to the volume serial number and the medium identifier of the virtual tape volume belonging to the group having been determined.

5. A computer system comprising:
a computer which receives a job;
a first storage device which stores a virtual tape data set corresponding to each of at least one virtual tape volume which has virtually emulated a magnetic tape by a disk device;
a second storage device which stores a management table used for grouping the virtual tape volume in job unit by a volume serial number and a medium identifier corresponding to the job unit for identifying the virtual tape volume and correlates the virtual tape volume with the virtual tape data set; and
a disk control device connected to the first storage device and the second storage device for determining a group of the virtual tape volume corresponding to the job unit and performing a data I/O processing for the virtual tape data set stored in the first storage device according to the management table upon execution of the job received from the computer, the virtual tape data set corresponding to the volume serial number and the medium identifier of the virtual tape volume belonging to the group having been determined.

6. A virtual tape volume employment system comprising:
a first storage device which stores a first management table for identifying a virtual tape volume which has virtually emulated a magnetic tape by a disk device according to a volume serial number referenced by a job and a medium identifier corresponding to a different media belonging to the serial number and to a different job, groups the virtual tape volume in job execution unit, and gives a magazine identifier for identifying the group to each group corresponding to the job execution unit;
a second storage device which stores a second management table for giving a virtual tape data set name to each tape data set when a virtual tape data set is created in the virtual tape volume and correlates it with a volume serial number and a medium identifier of a virtual tape data set output destination which is a virtual tape data set output medium;

a third storage device which stores a third management table for managing a correspondence between the job name and a magazine identifier of a virtual tape magazine; and a computer which acquires the magazine identifier corresponding to the job name according to the third management table upon job execution, acquires the virtual tape volume corresponding to the magazine identifier according to the first management table, acquires the virtual tape data set name corresponding to the virtual tape volume according to the second management table, and performs a data I/O processing between the virtual tape data set having the virtual tape data set name and a virtual tape device, the virtual tape data set corresponding to the volume serial number and the medium identifier of the virtual tape volume belonging to the job execution unit.

* * * * *